US012410584B2

(12) United States Patent
LaMourie et al.

(10) Patent No.: US 12,410,584 B2
(45) Date of Patent: Sep. 9, 2025

(54) VISUAL CUES TO REDUCE MARINE LIFE MORTALITY DURING A DREDGING OPERATION

(71) Applicant: GREAT LAKES DREDGE & DOCK COMPANY, LLC, Oak Brook, IL (US)

(72) Inventors: Paul LaMourie, Naperville, IL (US); Steve Becker, Downers Grove, IL (US); Justin Rensch, Glendale Heights, IL (US)

(73) Assignee: Great Lakes Dredge & Dock Company, LLC, Houston, TX (US)

( * ) Notice: Subject to any disclaimer, the term of this patent is extended or adjusted under 35 U.S.C. 154(b) by 1215 days.

(21) Appl. No.: 16/930,575

(22) Filed: Jul. 16, 2020

(65) Prior Publication Data
US 2021/0017734 A1 Jan. 21, 2021

Related U.S. Application Data

(60) Provisional application No. 62/875,223, filed on Jul. 17, 2019.

(51) Int. Cl.
| | |
|---|---|
| E02F 3/92 | (2006.01) |
| A01M 29/10 | (2011.01) |
| E02F 3/88 | (2006.01) |
| E02F 3/90 | (2006.01) |

(52) U.S. Cl.
CPC .......... *E02F 3/9243* (2013.01); *A01M 29/10* (2013.01); *E02F 3/885* (2013.01); *E02F 3/90* (2013.01)

(58) Field of Classification Search
CPC . E02F 3/9243; E02F 3/90; E02F 3/885; E02F 3/8841; B63B 2210/00; B63B 45/00; A01M 29/10; F21V 33/00; F21V 21/008
See application file for complete search history.

(56) References Cited

U.S. PATENT DOCUMENTS

| | | | | |
|---|---|---|---|---|
| 6,625,907 | B2 * | 9/2003 | Murray | E02F 3/885 37/332 |
| 10,167,609 | B1 * | 1/2019 | Cashman | B63B 27/25 |
| 11,557,142 | B1 * | 1/2023 | Kerzner | G06V 20/41 |
| 2019/0069535 | A1 * | 3/2019 | Hauck, Jr. | A01M 29/10 |
| 2019/0150382 | A1 * | 5/2019 | Luzuriaga | E02B 15/041 |

OTHER PUBLICATIONS

Creel, P., "ERDC demonstrates new equipment, approach," U.S. Army, Aug. 18, 2016.

* cited by examiner

*Primary Examiner* — Joseph M Rocca
*Assistant Examiner* — Robert E Pezzuto
(74) *Attorney, Agent, or Firm* — Foley & Lardner LLP (57) ABSTRACT

A system for dredging a seabed includes a trailing suction hopper dredger. The trailing suction hopper dredger includes a hull, a rail coupled to the hull, and a dredge arm coupled to the rail. The dredge arm includes an upper suction pipe coupled to a lower suction pipe. A pump is coupled to the upper suction pipe and is configured to draw material toward the upper suction pipe from the seabed. A visual marine life deterrent is coupled to the dredge arm and is configured to direct light toward the sea floor where marine life may be located. Another visual marine life deterrent includes a silhouette of a marine life predator. The visual marine life deterrents are configured to be observable by the marine life and cause marine life to move away from the dredge arm.

20 Claims, 4 Drawing Sheets

VISUAL CUES TO REDUCE MARINE LIFE MORTALITY DURING A DREDGING OPERATION

CROSS-REFERENCE TO RELATED APPLICATIONS

The present application claims priority to U.S. Provisional Patent Application No. 62/875,223, filed Jul. 17, 2019, the contents of which are incorporated herein in their entirety.

TECHNICAL FIELD

The present invention relates generally to systems for reducing the mortality of sea turtles and other marine life during dredging operations.

BACKGROUND

A trailing suction hopper dredger is a marine vessel used for dredging (e.g., removing) loose and soft soils such as sand, silt, gravel, or clay. One or more suction tubes equipped with a suction head are coupled to the vessel and are configured to reach the seabed. In a dredging operation using a trailing suction hopper dredger, the suction head is lowered to the seabed and dragged along the seabed. The vessel's pump system draws material up from the seabed and loads the material into the hold of the trailing suction hopper dredger.

During a dredging operation, the dredge arms and/or the suction mechanisms can contact marine life. For example, when contacted by the dredge arm and/or the suction mechanism, sea turtles can be harmed. There are a number of regulatory requirements and industry standards in place for marine operations in general for the purpose of reducing the amount of marine life harmed by the equipment being used. Similar requirements exist in the dredging industry to reduce harm caused to marine life during dredging operations.

SUMMARY

In one set of embodiments, a system for dredging a seabed comprises a trailing suction hopper dredger. The trailing suction hopper dredger includes a hull in contact with a body of water, a rail coupled to the hull, and a dredge arm coupled to the rail. The dredge arm includes an upper suction pipe coupled to the rail and a lower suction pipe coupled to the upper suction pipe. A drag head is coupled to the lower suction pipe, the drag head in fluid communication with the lower suction pipe and configured to contact a seabed. A visual marine life deterrent is coupled to the dredge arm and is configured to direct light toward the sea floor where marine life may be located. The light is configured to be observable by the marine life, thereby influencing the marine life to move away from the dredge arm. A pump is coupled to the upper suction pipe and is in fluid communication with the upper suction pipe. The pump is configured to draw material toward the upper suction pipe from the seabed.

In another set of embodiments a system for dredging a seabed comprises a rail configured to be coupled to a hull of a dredging vessel. A dredge arm is coupled to the rail and comprises an upper suction pipe coupled to the rail and a lower suction pipe coupled to the upper suction pipe. The dredge arm further comprises a drag head coupled to the lower suction pipe, the drag head in fluid communication with the lower suction pipe and configured to contact a seabed. A visual marine life deterrent is coupled to the dredge arm, the visual marine life deterrent comprising a silhouette of a marine life predator. The marine life predator is configured to be observable by the marine life, thereby influencing the marine life to move away from the dredge arm. A pump is coupled to the upper suction pipe. The pump is in fluid communication with the upper suction pipe and is configured to draw material toward the upper suction pipe from the seabed.

In yet another set of embodiments, a system for dredging a seabed includes a trailing suction hopper dredger. The trailing suction hopper dredger includes a hull in contact with a body of water, and a dredge arm operatively coupled to the rail. The dredge arm includes an upper suction pipe operatively coupled to the rail and a lower suction pipe coupled to the upper suction pipe. A drag head is coupled to the lower suction pipe and is in fluid communication with the lower suction pipe and configured to contact the seabed. A marine life deterrent is coupled to the dredge arm and includes a physical marine life deterrent and a visual marine life deterrent. The physical marine life deterrent comprises a first end coupled to the dredge arm and a second end configured to hang freely from the first end. The visual marine life deterrent is coupled to the physical marine life deterrent and is configured to direct light based on an orientation of the physical marine life deterrent. A pump is coupled to the upper suction pipe and is in fluid communication with the upper suction pipe and is configured to draw material toward the upper suction pipe from the seabed.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, a system for dredging a seabed. The various concepts introduced above and discussed in greater detail below may be implemented in any of numerous ways, as the described concepts are not limited to any particular manner of implementation. Examples of specific implementations and applications are provided primarily for illustrative purposes.

I. Overview

A trailing suction hopper dredger ("TSHD") is configured to remove material from the sea floor via suction mechanisms attached to dredge arms. In some instances, the dredging process results in harm to marine life in the dredging location. Implementations herein relate to deterrents that function to reduce or eliminate harm to marine life resulting from the dredging process. In some embodiments, the deterrents include an array of lights, such as LED lights that are sufficiently powerful to be seen by marine life through the turbid waters caused by the dredging process. Other arrangements include one or more lights in communication with a reflector to amplify and distribute the effect of the lights. Silhouettes of predators can also be used to deter marine life, in some implementations.

II. Conventional Trailing Suction Hopper Dredger

Figure 1:
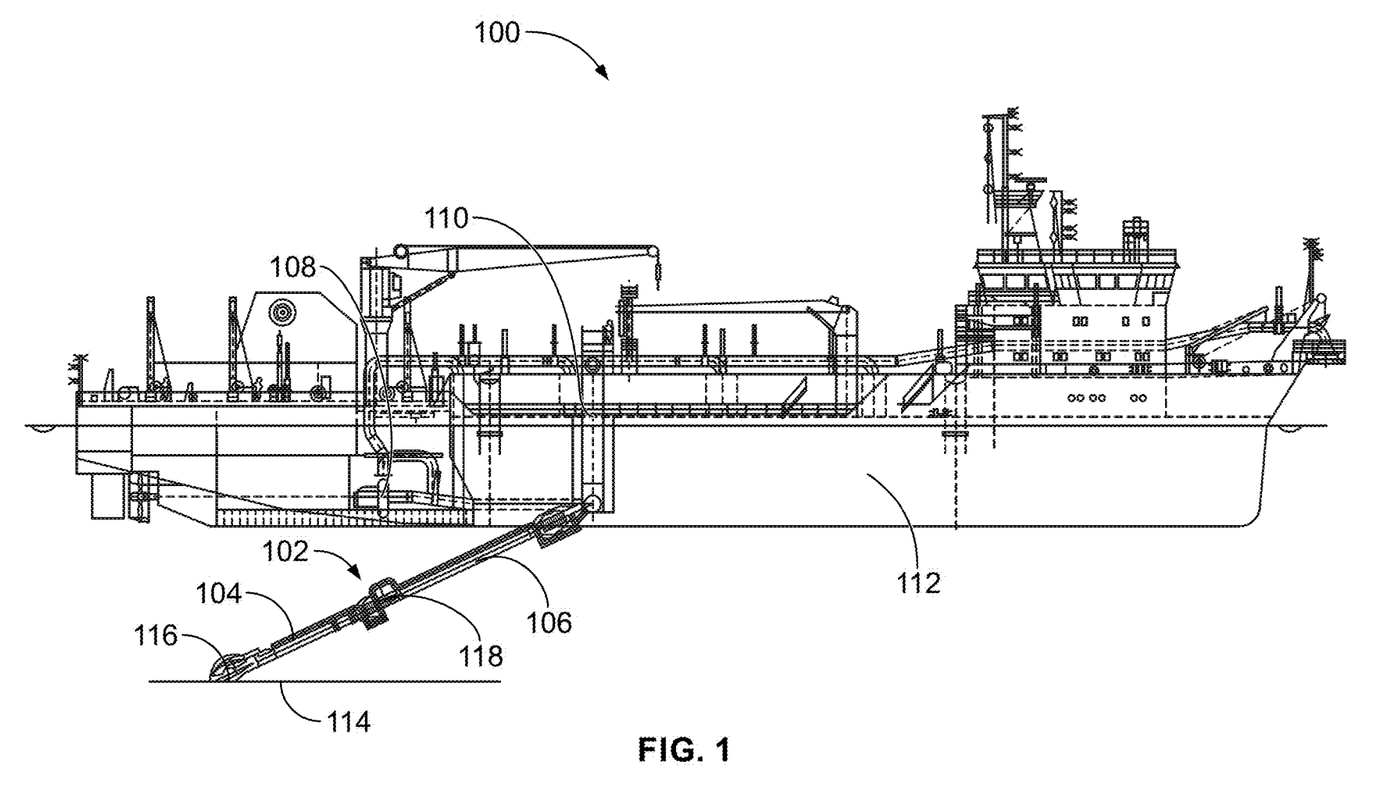
FIG. 1 is an illustration of a trailing suction hopper dredger.

FIG. 1 is an illustration of a TSHD 100. The TSHD 100 is shown to include a dredge arm 102, a rail 110, and a hull 112. The dredge arm 102 is rotatably and translationally coupled to the rail 110, and the rail 110 is coupled to the hull 112. In a deployed position, the dredge arm 102 extends below the hull 112, as shown. To return to a stored position (not shown), the dredge arm 102 is hoisted toward the hull 112 until the dredge arm 102 is in a horizontal position. The dredge arm 102 is raised along the rail 110 until the dredge arm 102 reaches the deck of the TSHD 100 such that the dredge arm 102 can be secured until the next use.

The dredge arm 102 further includes a lower suction pipe 104, an upper suction pipe 106, and a drag head 116. The lower suction pipe 104 is coupled to the upper suction pipe 106 by an intermediate joint 118 (e.g., a gimbal joint) that provides for angular rotation of the lower suction pipe 104 relative to the upper suction pipe 106 in multiple planes. The components of the dredge arm 102 can be manufactured from any material suitable for use in marine dredging operations (e.g., metals, composites, or other materials suitable for the application). The upper suction pipe 106 is coupled to the rail 110 and provides a conduit through which material from the seabed 114 is transferred to the hull 112. The pump 108 is located in the hull 112 and is coupled to the upper suction pipe 106. The pump 108 is configured to direct material from the seabed 114 into the lower suction pipe 104 from the drag head 116. The lower suction pipe 104 is coupled to the drag head 116 and provides a conduit through which material from the seabed 114 flows as it is directed toward the hull 112. The drag head 116 is coupled to the lower suction pipe 104 and is configured to contact the seabed 114 and provide an aperture through which material from the seabed 114 is directed through the drag head 116 and into the lower suction pipe 104 as the material is directed toward the hull 112.

III. Example Dredge Arm with Light Array

Figure 2:
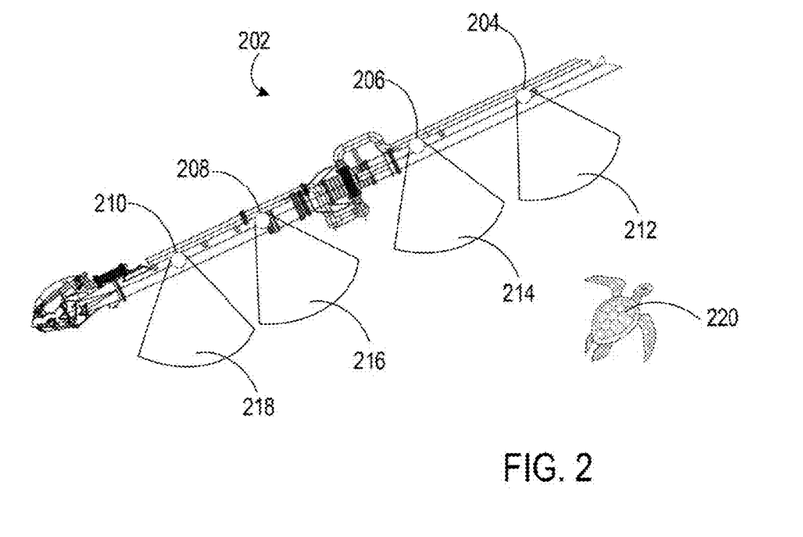
FIG. 2 is an illustration of a dredge arm for a trailing suction hopper dredger with a visual deterrent, according to a particular embodiment.

Referring to FIG. 2, an illustration of a dredge arm 202 with a visual deterrent is shown, according to a particular embodiment. The dredge arm 202 is substantially similar in construction to the dredge arm 102 of FIG. 1; however the dredge arm 202 includes additional components to act as a visual deterrent. The dredge arm 202 includes a first illumination device 204, a second illumination device 206, a third illumination device 208, and a fourth illumination device 210 (collectively referred to herein as "illumination devices 204-210"). It will be understood that any number of, and configuration of, illumination devices 204-210 can be used to achieve the purpose of deterring marine life, and the illumination devices 204-210 are shown as an exemplary embodiment. The first illumination device 204 emits a first illumination beam 212, the second illumination device 206 emits a second illumination beam 214, the third illumination device 208 emits a third illumination beam 216, and the fourth illumination device 210 emits a fourth illumination beam 218 (collectively referred to herein as "illumination beams 212-218").

The illumination devices 204-210 can be any type of illumination device that can be seen in turbid waters by marine life (e.g., a sea turtle 220). In some embodiments, the illumination devices 204-210 are green LEDs emitting a light with a brightness of around 10,000 lumens. The illumination devices 204-210 can include LEDs or other appropriate lighting systems that emit light of any color within the visible range for the sea turtle 220 (e.g., about 300 nanometers to about 650 nanometers) and any other brightness that provides visible light through turbidity caused by the dredge arm 202. The illumination devices 204-210 can direct the illumination beams 212-218 in a specific direction, in some implementations. For example, the illumination devices 204-210 can be floodlights that direct the illumination beams 212-218 away from the dredge arm 202 such that marine life moves away from the dredge arm 202. The illumination devices 204-210 can also be arranged around the dredge arm 202 (e.g., in a 360 degree arrangement around the dredge arm 202) to deter the sea turtle 220 from approaching the dredge arm 202 from all directions.

IV. Example Dredge Arm with Light Reflector

Figure 3:
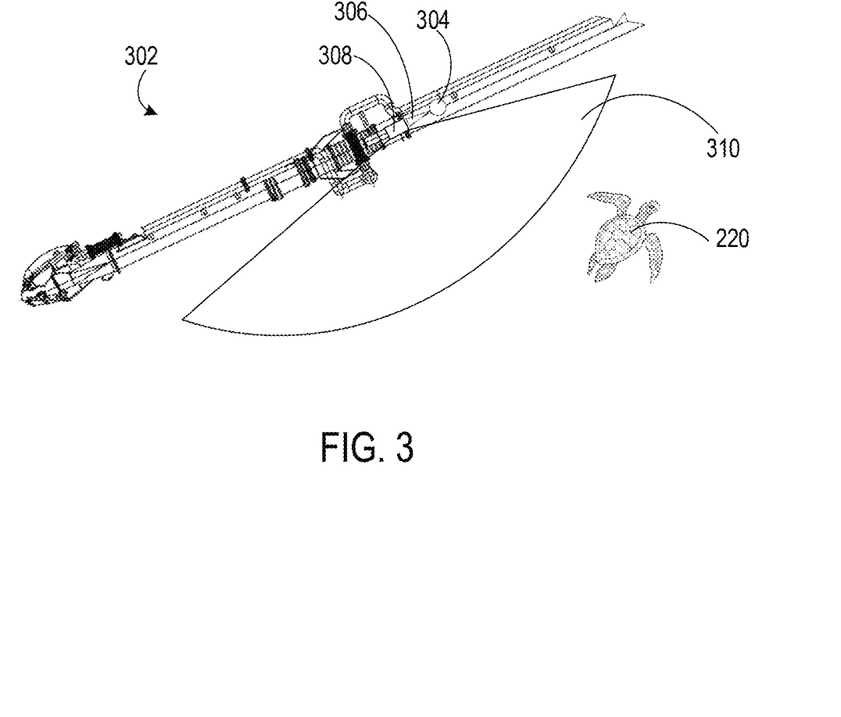
FIG. 3 is an illustration of a dredge arm with another visual deterrent.

Referring to FIG. 3, an illustration of a dredge arm 302 with another visual deterrent is shown. The dredge arm 302 is substantially similar in construction to the dredge arm 102 of FIG. 1; however the dredge arm 302 includes additional components to act as a visual deterrent for the sea turtle 220. The dredge arm 302 includes an illumination device 304 and a reflection device 308. The illumination device 304 can be any type of illumination device with sufficient brightness to be seen in turbid waters by marine life (e.g., the sea turtle 220) after being reflected. For example, the illumination device 304 can include a green LED emitting light with a brightness of approximately 10,000 lumens. The illumination device 304 can include LEDs or other appropriate lighting systems which emit light of any color within the visible range for the sea turtle 220 (e.g., about 300 nanometers to about 650 nanometers) and any other brightness that provides visible light after reflection through the turbidity caused by the dredge arm 302 during a dredging operation. The illumination device 304 includes an illumination beam 306 directed toward the reflection device 308.

The reflection device 308 is coupled to the dredge arm 302 and is configured to reflect light from the illumination beam 306 such that the light is directed away from the dredge arm 302. In some embodiments, the reflection device 308 is coupled directly to the dredge arm 302. In some arrangements, the reflection device 308 is coupled indirectly to the dredge arm 302. For example, the reflection device 308 can be coupled to the dredge arm 302 via a flexible connector (e.g., a rope, cord, chain, etc.) or an inflexible connector (e.g., a rod, pipe, etc.) such that the reflection device 308 is spaced apart from the dredge arm 302. In embodiments where the reflection device 308 is spaced apart from the dredge arm 302, the orientation of the illumination device 304 and the illumination beam 306 are adjusted such that the light is directed toward the reflection device 308.

The reflection device 308 can include a reflective surface configured to reflect the light from the illumination beam 306. In some arrangements, the reflection device 308 is a multi-faceted mirror positioned such that, when the light from the illumination beam 306 reaches the reflection device 308, the facets direct the light in a plurality of directions away from the dredge arm 302, thereby creating a reflection beam 310 that can be seen by the sea turtle 220. The reflection beam 310 can be the same brightness as the illumination beam 306 (e.g., approximately 10,000 lumens), in some implementations. The reflection device 308 can also be configured to amplify the brightness of the illumination beam 306. In such configurations, the illumination beam 306 can be dimmer than approximately 10,000 lumens and the reflection device 308 can amplify the illumination beam 306 such that the reflection beam 310 is approximately 10,000 lumens.

It will be understood that multiple illumination devices 304 and reflection devices 308 can be arranged around the dredge arm 302 (e.g., in a 360 degree pattern around the dredge arm 302) such that multiple reflection beams 310 are directed away from the dredge arm 302 to deter the sea turtle 220 from approaching the dredge arm 302 from any direction during a dredging operation.

V. Example Dredge Arm with Predator Proxy

Figure 4:
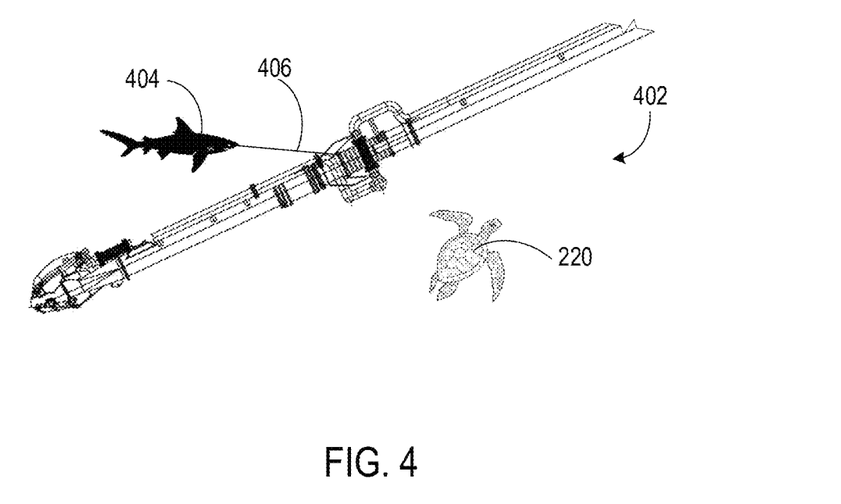
FIG. 4 is an illustration of a dredge arm with yet another visual deterrent.

Referring to FIG. 4, an illustration of a dredge arm 402 with yet another visual deterrent is shown. The dredge arm 402 is substantially similar in construction to the dredge arm 102 of FIG. 1; however the dredge arm 402 includes additional components to act as a visual deterrent for the sea turtle 220. The dredge arm 402 includes a shark silhouette 404 and a connector 406.

The shark silhouette 404 is configured to be of a similar size and shape as a living shark when viewed from the side. The shark silhouette 404 can be constructed of any material suitable to provide for realistic movement as the shark silhouette 404 moves through water (e.g., an undulating movement that mimics the movement of a shark in the water). An example of a suitable material for the shark silhouette 404 includes vinyl. The shark silhouette 404 is coupled to the dredge arm 402 via the connector 406. The connector 406 can be a rigid connector (e.g., a rod, pipe, etc.), in some embodiments. The connector 406 can also be a flexible connector (e.g., a rope, cord, chain, etc.). In either instance, as the dredge arm 402 is pulled through the water by the TSHD 100, the shark silhouette 404 is pulled through the water via the connector 406. A shark is a natural predator of the sea turtle 220, and seeing a shark in the water causes the sea turtle 220 to leave the area. Similarly, seeing the shark silhouette 404 near the dredge arm 402 causes the sea turtle 220 to leave the area around the dredge arm 402. It will be understood that any number of shark silhouettes 404 can be arranged around the dredge arm 402 in various orientations to deter the sea turtle 220.

VII. Example Dredge Arm with Visual Deterrent and a Physical Deterrent

Figure 5:
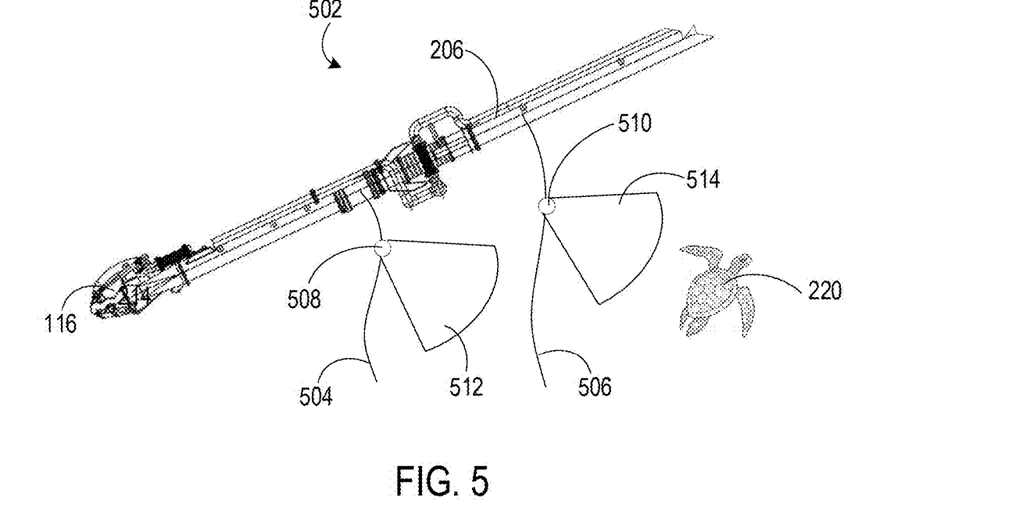
FIG. 5 is an illustration of a dredge arm with a visual deterrent coupled to a physical deterrent.

Referring to FIG. 5, an illustration of a dredge arm 502 with a visual deterrent coupled to a physical deterrent is shown. The dredge arm 502 is substantially similar in construction to the dredge arm 102 of FIG. 1; however the dredge arm 502 includes additional components to act as a visual deterrent and a physical deterrent for the sea turtle 220. The dredge arm 502 includes a first flexible component 504 and a second flexible component 506 (collectively referred to herein as "flexible components 504-506"). In some embodiments, one or more of the flexible components 504-506 may include a plurality of flexible components arranged across a width of the draghead 116. Such embodiments are described with reference to FIG. 6.

Each of the flexible components 504-506 is coupled to the dredge arm 502 at a first end such that a second end is configured to hang freely from the first end. In some embodiments, the second end extends toward and contacts the seabed. The second end may also be configured such that a predetermined length of the second end remains in contact with the seabed when the dragarm 116 is in contact with the seabed. In example embodiments, the predetermined length is between two and ten feet, between three and nine feet, between four and eight feet, and between five and seven feet. As the TSHD 100 moves through the water, the second ends of the flexible components 504-506 move through the water. In some embodiments, one or more of the second ends contacts the sea turtle 220 as the TSHD 100 moves through the water. Upon contact from the second ends, the sea turtle 220 may move away from the dredge arm 502, thereby preventing harm to the sea turtle 220. Accordingly, the flexible components 504-506 may be constructed of any material suitable to be pulled through the water and contact the sea turtle 220. The flexible components 504-506 may be formed, for example, from metal (e.g., a chain constructed of at least two metal links where a first link is coupled to the dredge arm 502, a second link is movably coupled to the first link, a third link is movably coupled to the second link etc., where each link hangs freely from the previous link in the chain). Regardless of the material from which the flexible components 504-506 are constructed, the flexible components 504-506 are configured to contact marine life (e.g., the sea turtle 220) without crushing, pinning in place, exerting excessive force upon, or otherwise harming the marine life.

Alternatively or additionally, the dredge arm 502 may act as a visual deterrent for the sea turtle 220. In an example embodiment, the first flexible component 504 includes a first illumination device 508 and the second flexible component 506 includes a second illumination device 510. The first illumination device 508 and the second illumination device 510 are collectively referred to herein as "illumination devices 508-510." The illumination devices 508-510 are substantially similar to the illumination devices 204-210 except that the illumination devices 508-510 are coupled to the flexible components 504-506 instead of the dredge arm 502. Accordingly, the description of the various embodiments of the illumination devices 204-210 applies to the illumination devices 508-510. The illumination devices 508-510 may be coupled directly to the flexible components 504-506 such that the first illumination device 508 is in physical contact with the first flexible component 504 and the second illumination device is in physical contact with the second flexible component 510. The illumination devices 508-510 may also be coupled indirectly to the flexible components 504-506 such that the first illumination device 508 is not in physical contact with the first flexible component 504 and the second illumination device is in not in physical contact with the second flexible component 510. For example, the illumination devices 508-510 may be coupled to the flexible components 504-506 via a rope, a rod, or any other device or apparatus that is configured to couple the illumination devices 508-510 to the flexible components 504-506.

As the TSHD 100 moves through the water, the first illumination device 508 emits a first illumination beam 512 and the second illumination device 510 emits a second illumination beam 514 (collectively referred to herein as "illumination beams 512-514"). As the flexible components 504-506 move through the water, the light from the illumination beams 512-514 is directed in various directions, where the various directions depend on the orientation of the flexible components 504-506. When the sea turtle 220 sees the light from the illumination beams 512-514, the sea turtle 220 moves away from the dredge arm 502, thereby preventing harm to the sea turtle 220.

In some embodiments, the flexible components 504-506 can be included on any of the embodiments of the dredge arms 202, 302, 402, and 502 to provide a physical deterrent in addition to the visual deterrents previously described. Though two flexible components are shown in the example embodiment, one of ordinary skill would understand that the dredge arm 502 can include more or fewer flexible components. Additionally, although each of the flexible components 504-506 is shown to include one illumination device, one or more of the flexible components 504-506 may include more than one illumination device.

Figure 6:
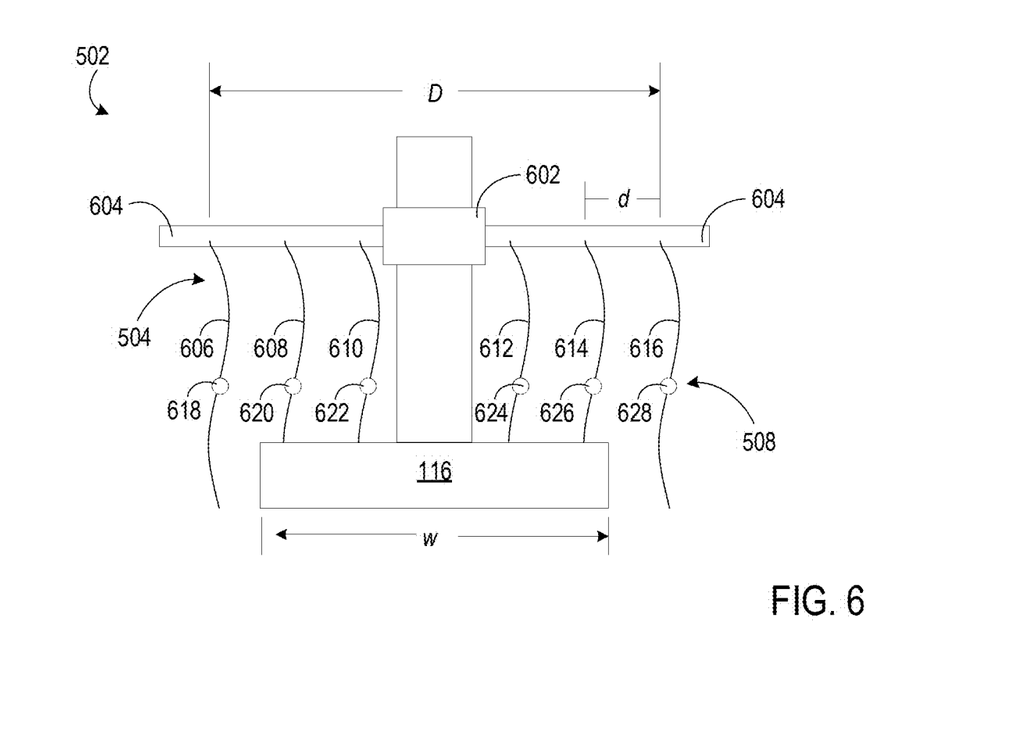
FIG. 6 is a detailed front view of the visual deterrent and the physical deterrent of the dredge arm of FIG. 5.

FIG. 6 is a detailed illustration of a front view of the visual deterrent and the physical deterrent of the dredge arm 502 of FIG. 5. As shown, the flexible component 504 includes a first flexible element 606, a second flexible element 608, a third flexible element 610, a fourth flexible element 612, a fifth flexible element 614, and a sixth flexible element 616 (collectively referred to herein as "flexible elements 606-616"). Each of the flexible elements 606-616 may include, for example, a chain constructed of metal. Though six flexible elements are shown, one of skill in the art would appreciate that more or fewer flexible elements could be used. Each of the flexible elements 606-616 is coupled to an arm 604, and the arm 604 is coupled to and extends from a retaining ring 602. The arm 604 is rigid and is configured to support the flexible elements 606-616. The retaining ring 602 is configured to rotate with respect to the dredge arm 502 when the arm 604 contacts an object. For example, when raising the dredge arm 502 out of the water, the arm 604 may contact the hull 112. In such instances, the retaining ring 602 rotates thereby preventing the arm 604 from damaging the hull 112.

The flexible elements 606-616 are spaced apart from each other by a distance d. In some embodiments, the distance d is approximately (e.g., within plus or minus ten percent) twelve inches. The flexible elements 606-616 are configured such that the distance D between the flexible element 606 and the flexible element 616 is greater than a width w of the draghead 116. Arranged as described, the flexible elements 606-616 are configured to contact marine life as the draghead 116 moves along the seabed to move the marine life out of the way of the draghead 116.

Additionally and as shown, the illumination device 508 includes a first light 618 coupled to the first flexible element 606, a second light 620 coupled to the second flexible element 608, a third light 622 coupled to the third flexible element 610, a fourth light 624 coupled to the fourth flexible element 612, a fifth light 626 coupled to the fifth flexible element 614, and a sixth light 628 coupled to the sixth flexible element 616. The first light 618, the second light 620, the third light 622, the fourth light 624, the fifth light 626, and the sixth light 628 are referred to herein as "lights 618-628." As the flexible elements 606-616 move through the water, the lights 618-628 move as well. Because each of the flexible elements 606-616 may encounter different water currents and/or turbulence and different objects located on the seabed, the flexible elements 606-616 may move independently of each other and be oriented differently than each other. Accordingly, the lights 618-628 may move independently of each other, thereby illuminating various portions of the water as the TSHD 100 moves through the water to motivate the marine life (e.g., the sea turtle 220) to move out of the way of the dredge arm 502 and the drag head 116.

VI. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A system for dredging a seabed, comprising:
   a trailing suction hopper dredger, the trailing suction hopper dredger comprising:
   a hull in contact with a body of water;
   a rail coupled to the hull;
   a dredge arm coupled to the rail, the dredge arm comprising;
   an upper suction pipe coupled to the rail;
   a lower suction pipe coupled to the upper suction pipe;
   a drag head coupled to the lower suction pipe, the drag head in fluid communication with the lower suction pipe and configured to contact the seabed;
   a visual marine life deterrent coupled to an intermediate location along the dredge arm via a connector, the connector including a flexible portion extending from the dredge arm, such that the visual marine life deterrent is movably suspended in the water between a sea floor and a surface of the water, the visual marine life deterrent configured to direct light toward the sea floor where marine life may be located, the light configured to be observable by the marine life, thereby influencing the marine life to move away from the dredge arm; and
   a pump coupled to the upper suction pipe, the pump in fluid communication with the upper suction pipe and configured to draw material toward the upper suction pipe from the seabed.

2. The system of claim 1, wherein the visual marine life deterrent comprises an illumination device.

3. The system of claim 2, wherein the light emitted by the illumination device has a brightness of approximately 10,000 lumens.

4. The system of claim 2, wherein the illumination device emits a green light.

5. The system of claim 2, wherein the illumination device comprises a light emitting diode.

6. The system of claim 2, wherein the illumination device emits a light that is of a wavelength that is visible to sea turtles.

7. The system of claim 2, further comprising a reflection device operatively coupled to the dredge arm, the reflection device operable to reflect a light beam from the illumination device.

8. A system for dredging a seabed, comprising:
   a rail configured to be coupled to a hull of a dredging vessel;
   a dredge arm coupled to the rail, the dredge arm comprising;
   an upper suction pipe coupled to the rail;
   a lower suction pipe coupled to the upper suction pipe;
   a drag head coupled to the lower suction pipe, the drag head in fluid communication with the lower suction pipe and configured to contact a seabed;
   a visual marine life deterrent coupled to an intermediate location along the dredge arm, the visual marine life deterrent coupled to the intermediate location via a connector, the connector including a flexible portion extending from the dredge arm, such that the visual marine life deterrent is movably suspended within the water between a sea floor and a surface of the water, the visual marine life deterrent comprising a silhouette of a marine life predator, the marine life predator configured to be observable by marine life, thereby influencing the marine life to move away from the dredge arm; and
   a pump coupled to the upper suction pipe, the pump in fluid communication with the upper suction pipe and configured to draw material toward the upper suction pipe from the seabed.

9. The system of claim 8, wherein the marine life predator is a shark.

10. The system of claim 8, wherein the connector is a flexible connector coupling the visual marine life deterrent to the dredge arm.

11. The system of claim 8, wherein the connector includes a rigid connector coupling the visual marine life deterrent to the dredge arm.

12. A system for dredging a seabed, comprising:
    a trailing suction hopper dredger, the trailing suction hopper dredger comprising;
    a hull in contact with a body of water;
    a dredge arm operatively coupled to the hull, the dredge arm comprising;
    an upper suction pipe operatively coupled to the hull;
    a lower suction pipe coupled to the upper suction pipe;
    a drag head coupled to the lower suction pipe, the drag head in fluid communication with the lower suction pipe and configured to contact the seabed;
    a marine life deterrent coupled to the dredge arm, the marine life deterrent comprising:
    a physical marine life deterrent including a first end coupled to the dredge arm and a second end configured to hang freely from the first end; and
    a visual marine life deterrent coupled to the physical marine life deterrent and an intermediate location along the dredge arm via a connector, the connector including a flexible portion extending from the dredge arm, such that the visual marine life deterrent is movably suspended in the water between a sea floor and a surface of the water, the visual marine life deterrent configured to direct light based on an orientation of the physical marine life deterrent; and
    a pump coupled to the upper suction pipe, the pump in fluid communication with the upper suction pipe and configured to draw material toward the upper suction pipe from the seabed.

13. The system of claim 12, wherein the visual marine life deterrent is in contact with the physical marine life deterrent.

14. The system of claim 12, wherein the visual marine life deterrent comprises an illumination device.

15. The system of claim 12, further comprising a rail coupled to the hull, wherein the dredge arm is coupled to the rail.

16. The system of claim 14, wherein the illumination device emits a green light.

17. The system of claim 14, wherein the illumination device comprises a light emitting diode.

18. The system of claim 14, wherein the light emitted by the illumination device has a brightness of approximately 10,000 lumens.

19. The system of claim 18, wherein the illumination device emits a light that is of a wavelength that is visible to sea turtles.

20. A system for dredging a seabed, comprising:
- a trailing suction hopper dredger, the trailing suction hopper dredger comprising;
  - a hull in contact with a body of water;
  - a dredge arm operatively coupled to the hull, the dredge arm comprising;
    - an upper suction pipe operatively coupled to the hull;
    - a lower suction pipe coupled to the upper suction pipe;
    - a drag head coupled to the lower suction pipe, the drag head in fluid communication with the lower suction pipe and configured to contact the seabed;
  - a marine life deterrent coupled to the dredge arm, the marine life deterrent comprising:
    - a physical marine life deterrent including a first end coupled to the dredge arm and a second end configured to hang freely from the first end, wherein the physical marine life deterrent further comprises:
      - a retaining ring rotatably coupled to the dredge arm;
      - an arm coupled to and extending from the retaining ring; and
      - a flexible element coupled to the arm;
    - a visual marine life deterrent coupled to the physical marine life deterrent, the visual marine life deterrent configured to direct light based on an orientation of the physical marine life deterrent; and
  - a pump coupled to the upper suction pipe, the pump in fluid communication with the upper suction pipe and configured to draw material toward the upper suction pipe from the seabed.

* * * * *